C. Lee.
Harvester Rake

No. 16735                        Patented Mar. 3. 1857

UNITED STATES PATENT OFFICE.

CALEB LEE, OF KNOX TOWNSHIP, COLUMBIANA COUNTY, OHIO.

IMPROVED RAKER FOR REAPING-MACHINES.

Specification forming part of Letters Patent No. 16,735, dated March 3, 1857.

*To all whom it may concern:*

Be it known that I, CALEB LEE, of Knox township, in the county of Columbiana and State of Ohio, have invented a new and useful Improvement in the Raker for Reaping-Machines; and I do hereby declare that the following is a full, clear, and exact description of the construction and operation of the same, reference being had to the annexed drawings, which make a part of this specification, in which—

Figure 1:
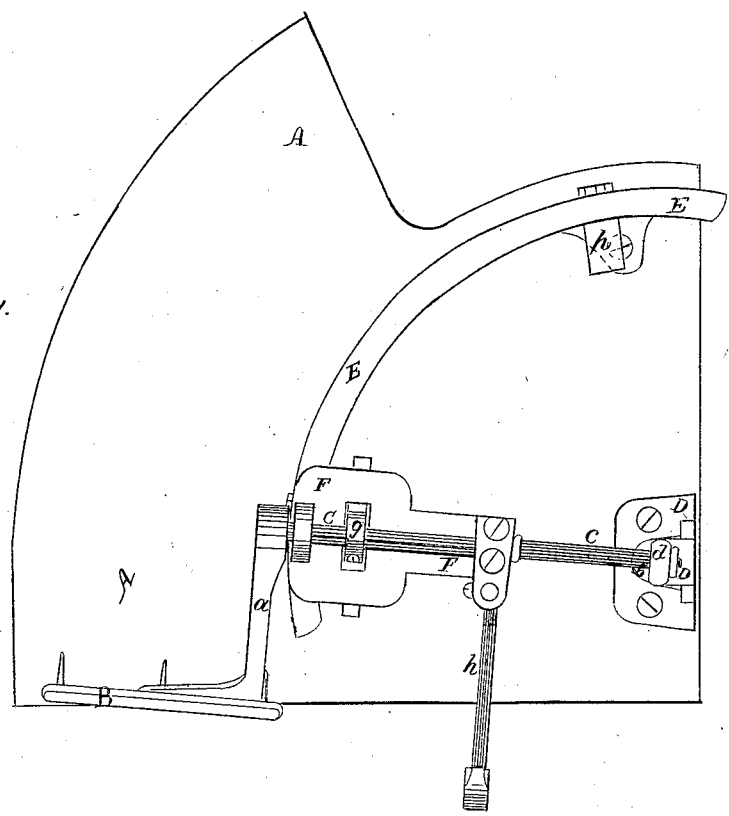
Figure 3:
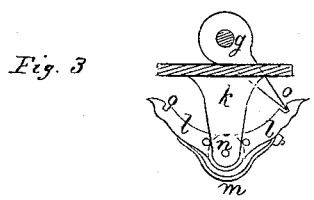
Figure 2:
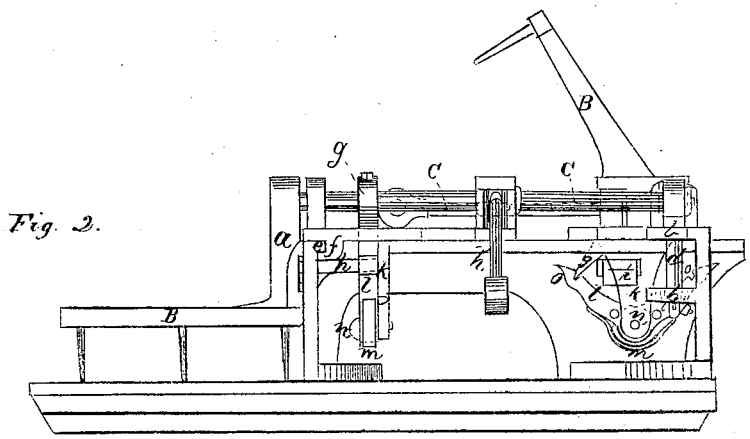

Figure 1 is a top view; Fig 2, a front end view, and Fig. 3 some of the parts in detail.

In Fig. 1, A A is the platform on which the grain falls as it is first cut. B is the rake. C C is a shaft, to which the rake is attached by the arm $a$, and which carries the rake. D D is an upright post or standard, attached to the platform, having two projections, $b\,b$. (Better seen in Fig. 2.) Through these projections passes a center pin, $d$, which serves to secure the inner end of the rake-shaft C C, which passes through the head of this pin, where it may turn freely, so as to raise or lower the rake, while the pin itself also turns freely upon its center. E E is a bearing or ways, secured to the platform, making in form a section of a circle, and having a flange, $e$, (seen in Fig. 2,) at the top. F F is a plate connected with the rake-shaft C C, supported by the bearing E E, upon which it moves forward and backward with the shaft and rake to do its work. In the outer edge of the plate F F is a groove, $f$, in Fig. 2, to admit the flange $e$, which holds the plate to the bearing as it slides upon it. Attached to the shaft C C is a pointed lever, $g$, (seen through a mortise, and also in Fig. 3,) to raise or lower the rake. The pitman $h$ is also attached to the same shaft, and, being moved by a crank upon the shaft of the driving-wheel, communicates motion to the whole.

In Fig. 2, besides the parts already described, there is an arm, $k$, projecting downward, to which are attached two latches, $l\,l$, which work upon the pivot $n$, and are held in place by the spring $m$. In each of these latches is a notch, (see $o$ in Fig. 3,) which receives and holds the pointed end of lever $g$, so as to keep the rake up or down while it passes over the required space. $p\,p$ are two pins, (see also Fig. 1,) projecting inwardly from the bearing E E. These pins serve in turn to lower one latch and disengage the lever $g$ therefrom, and force it into the notch of the other latch as the shaft moves forward and backward, and thus alternately, by means of the lever, raising or lowering the rake and holding it in its proper position up or down while it sweeps backward or forward to execute its work.

It will be noticed that my lever $g$ is itself a sharp-pointed iron, and when in operation is forced by the pins into the notches, the position of which is pretty secure from any interruption by straw and dirt; but even should straw and dirt be present it would not clog their action. The lever, being of iron and sharp-pointed, cuts its way into the notch to do its office.

The operation of my raker will be understood by practical men from the description already given, and it need only be added that in Figs. 1 and 2 the rake is shown in its advanced position and down, while in Fig. 2, in red lines, it is shown to be raised by the combined operation of the latches, the pointed lever, and the pins, the whole being rendered simple, cheap, and efficient.

What I claim as my invention, and desire to secure by Letters Patent, is—

The two spring-latches $l\,l$, working upon the arm $k$, in combination with the pointed lever $g$, the latches being notched to receive the same, and both the lever and latches being arranged so as to be acted upon alternately by the pins $p\,p$ to raise or lower the rake and hold it in either position, as required, all in the manner and for the purpose as herein set forth.

CALEB LEE.

Witnesses:
SIMON JOHNSON,
A. I. MARTIN.